United States Patent [19]

Sen et al.

[11] Patent Number: 5,521,281
[45] Date of Patent: May 28, 1996

[54] SUBSTANTIALLY ISOTACTIC, LINEAR, ALTERNATING COPOLYMERS OF CARBON MONOXIDE AND AN OLEFIN

[75] Inventors: Ayusman Sen; Zhaozhong Jiang, both of State College, Pa.

[73] Assignee: The Penn State Research Foundation, University Park, Pa.

[21] Appl. No.: 424,777

[22] Filed: Apr. 18, 1995

[51] Int. Cl.$^6$ .............................. C08G 67/02; C08F 6/00
[52] U.S. Cl. .......................... 528/392; 525/539; 528/271; 528/488; 528/491; 528/492
[58] Field of Search ..................................... 528/271, 392, 528/488, 491, 492; 525/539

[56] References Cited

U.S. PATENT DOCUMENTS

| | | | |
|---|---|---|---|
| 4,965,341 | 10/1990 | Van Duorn et al. | 528/392 |
| 4,970,294 | 11/1990 | Drent et al. | 528/392 |
| 5,019,645 | 5/1991 | Wong et al. | 528/488 |
| 5,070,184 | 12/1991 | Wong et al. | 528/491 |
| 5,171,892 | 12/1992 | Burk | 568/12 |

FOREIGN PATENT DOCUMENTS

| | | | |
|---|---|---|---|
| 213671 | 3/1987 | European Pat. Off. | C08G 67/02 |
| 376364 | 7/1990 | European Pat. Off. | C08G 67/02 |

OTHER PUBLICATIONS

M. J. Burk et al., "Preparation and Use of C$_2$-Symmetric Bis(Phospholanes): Production of α–Amino Acid Derivatives via Highly Enantioselective Hydrogenation Reactions", J. Amer. Chem. Soc. 1993, 115, 10125–10138.

F. Y. Xu et al., "Regio– and Stereo–selective Alternating Copolymerization of Carbon Monoxide With Propene", Makromol. Chem. 194, 2579–2603 (1993).

A. Sen, "Mechanistic Aspects of Metal–Catalyzed Alternating Copolymerization of Olefins with Carbon Monoxide", Acc. Chem. Res. 1993, 26. 303–310.

M. Brookhart et al., "Palladium(II) Catalysts for Living Alternating Copolymerization of Olefins and Carbon Monoxide", J. Amer. Chem. Soc. 1992, 114, 5894–5895.

S. H. Strauss, "The Search for Larger and More Weakly Coordinating Anions", Chem. Rev. 1993, 93, 927–942.

E. Drent et al., "Efficient Palladium Catalysts for the Copolymerization of Carbon Monoxide with Olefins to Produce Perfectly Alternating Polyketones", Journal of Organometallic Chemistry, 417 (1991), 235–251.

M. Barsacchi et al., "Stereochemistry of Alternating Copolymers of Vinyl Olefins with Carbon Monoxide", Macromolecules 1992, 25, 3604–3606.

A. Batistini et al., "Regioselectivity Control in the Palladium–Catalyzed Copolymerization of Propylene with Carbon Monoxide", Angew. Chem. Int. Ed. Engl. 31 (1992) No. 3, 303–305.

*Primary Examiner*—Shelley A. Dodson
*Attorney, Agent, or Firm*—Richard F. Fennelly; Louis A. Morris

[57] ABSTRACT

The compound, [Pd(Me-DUPHOS)(MeCN)$_2$](BF$_4$)$_2$, [Me-DUPHOS: 1,2-bis(2,5-dimethylphospholano)benzene] is an effective catalyst for the highly enantioselective, alternating copolymerization of olefins, such as aliphatic α-olefins, with carbon monoxide to form optically active, isotactic polymers which can serve as excellent starting materials for the synthesis of other classes of chiral polymers. For example, the complete reduction of a propylene-carbon monoxide copolymer resulted in the formation of a novel, optically active poly(1,4-alcohol). Also, the previously described catalyst is a catalyst for the novel alternating isomerization cooligomerization of 2-butene with carbon monoxide to form optically active, isotactic poly(1,5-ketone)

34 Claims, No Drawings

SUBSTANTIALLY ISOTACTIC, LINEAR, ALTERNATING COPOLYMERS OF CARBON MONOXIDE AND AN OLEFIN

The Government has rights to portions of this invention in view of support under a grant from U.S. Department of Energy, Office of Basic Energy Sciences (DE-FG02-84ER13295).

BACKGROUND OF THE INVENTION

Most synthetic chiral polymers are derived from chiral monomers. Given the limited availability of enantiomerically enriched monomers, it is far more attractive to design synthetic strategies involving the enantioselective polymerization of prochiral monomers. However, reports of such procedures where the polymer chirality arises from asymmetric backbone configurations rather than restricted conformational states (e.g., helicity) are exceedingly rare.

There have been numerous disclosures on the palladium(II) catalyzed alternating copolymerization of α-olefins with carbon monoxide to form poly(1,4-ketone)s. These α-olefin-carbon monoxide copolymers, unlike poly(α-olefin)s, have truly stereogenic centers in the polymer backbone. Using the R,S convention, the dyads can be described as RR or SS, and RS or SR. Similarly, the four possible triads are RRR or SSS, RSR or SRS, RSS or SRR, and RRS or SSR. At the high molecular weight limit, a syndiotactic alternating α-olefin-carbon monoxide copolymer chain will always show vanishingly small optical activity since the absolute configuration of the stereogenic centers in the backbone alternates (i.e., . . . RSRSRS . . . ). On the other hand, the stereogenic centers in the individual chains of an isotactic alternating α-olefin-carbon monoxide copolymer sample have the same absolute configurations (i.e., . . . RRRRRR . . . or . . . SSSSSS . . . ), and, thus, the synthesis of optically active, isotactic alternating α-olefin-carbon monoxide copolymers. should be possible. Furthermore, given the ease with which the carbonyl group can be chemically modified such polymers should be excellent starting materials for other classes of chiral polymers. Brookhart has recently reported the isospecific copolymerization of styrene with carbon monoxide using a chelating bisamine ligand-based catalyst system. (See M. Brookhart et al., J. Amer. Chem. Soc. 1992, 114, 5894). On the other hand, the optimal catalysts for the copolymerization of aliphatic α-olefins with carbon monoxide are based on chelating bisphosphines. In the few instances in which the synthesis of chiral aliphatic α-olefin-carbon monoxide copolymers have been reported, the enantioselectivity has either been low or not determined (for example, the possible presence of heterochiral chains has not been eliminated). (See Z. Jiang et al., Macromolecules, 1994, 27, 2694, S. Bronco et al., Macromolecules, 1994, 27, 4436, M. Barasacchi et al., Macromolecules, 1992, 25, 3604, and European Patent Publication No. 384,517).

In a recent paper (Organometallics, 1992, 11, 1766), Consiglio proposed an unusual chain growth mechanism involving cationic Pd-carbene species in order to account for the formation of polymers with spiroketal repeating units under certain conditions. This mechanism differs from the usually accepted two-step mechanism for chain growth involving the alternate insertions of carbon monoxide into Pd-alkyl bonds and olefin into Pd-acyl bonds.

Chien and coworkers (U.S. Pat. No. 5,352,767, in Example 4, for example, and Makromol. Chem. 194, 1993, 2579–2603, at page 2587 product from catalyst 4) show the copolymerization of carbon monoxide and an α-olefin where the isotacticity of the resulting product is at a maximum of only about 56%.

SUMMARY OF THE INVENTION

In regard to the present invention, the synthesis of optically active, isotactic aliphatic α-olefin-carbon monoxide copolymers with very high enantioselectivity (>90% by NMR spectroscopy), or "substantial isotacticity", are disclosed for the first time. Furthermore, in accordance with the present invention it is shown that while spiroketal repeating units may be present in stereoregular alternating copolymers of α-olefins with carbon monoxide, the poly(1,4-ketone)-poly(spiroketal) interchange can occur in the absence of a metal catalyst, and, therefore, it is unnecessary to invoke a special chain growth mechanism for the formation of poly(spiroketal).

The present invention relates to substantially isotactic, linear, alternating copolymer of carbon monoxide and an olefin, such as an unsubstituted α-olefin containing from three to about twenty carbon atoms, such as propylene, 1-butene, 2-butene, or 1-heptene, or an α-olefin which is substituted with a phenyl ring, such as allylbenzene.

Various embodiments of the present invention, which will be described below in regard to certain embodiments thereof, are deemed encompassed by the aforementioned generic description including: (1) isotactic copolymers which are formed from an α-olefin and which are poly(1,4-ketone)s, with the proviso that the α-olefin can have oxygen and/or nitrogen functionality such as hydroxy, carboxylic acid, and/or amino; (2) isotactic copolymers which are formed from an internal olefin (which needs to be 2-butene or higher or another internal olefin having a double bond in a more internal location in the olefin comonomer) and which are poly(1,5-ketone)s, poly(1,6-ketone)s, poly(1,7-ketone)s, and so forth; (3) substantially isotactic, linear, alternating copolymers of carbon monoxide and an olefin which comprises poly(spiro ketal) units; (4) mixtures of the foregoing optically pure (+) and (−) enantiomers of the polyketones which have increased melting points as compared to the individual enantiomers; and (5) the optically active, substantially isotactic, linear polyalcohol formed by the reduction of any of the aforementioned poly(1,4-ketone) or poly(1,5-ketone) copolymers.

The present invention also relates to a novel catalyst for polymerizing such monomers as well as the process of copolymerization using such a catalyst. This catalyst comprises (1) palladium, (2) a bidentate phosphine ligand containing a rigid bridging group and chiral moieties on the phosphorus atoms, and (3) a weakly coordinating anion, such as a borate anion, as the major components thereof. The bidentate ligand is preferably a 1,2-bis(2,5-dialkylphospholano)benzene compound, such as 1,2-bis(2,5-dimethylphospholano)benzene and the weakly coordinating anion is preferably a borate, such as boron tetrafluoride. The term "weakly coordinating" as used herein is intended to also cover other known anions of this type including the unsubstituted and substituted tetraphenylborates, the carborane anions, and the anionic methylaluminoxane anions. A recent review paper describing certain of these species is given in Chemical Reviews, 1993, 93, 927–942.

The present invention also relates to the discovery that an enantiomerically pure, isotactic, homochiral alternating α-olefin-carbon monoxide copolymer with a given chiral sense for the tertiary carbons in the main chain strongly prefers to form a stereocomplex with a second homochiral α-olefin-carbon monoxide copolymer with opposite chiral sense for the tertiary carbons in the main chain, even when the latter has a different pendant alkyl group. Given a choice between two different copolymers both with opposite chiral sense for the tertiary carbons, preferential complexation occurs with the copolymer with an identical pendant alkyl group. The stereocomplexes have melting points that are much higher than those for the corresponding enantiomerically pure components. The crystal structures of the stereocomplexes also differ from those of the pure components.

DESCRIPTION OF PREFERRED EMBODIMENTS

This invention, in one embodiment, relates to the unprecedented alternating isomerization cooligomerization of an acyclic internal olefin, such as 2-butene, with carbon monoxide. Very interestingly, the product was a poly(1,5-ketone) rather than the poly(1,4-ketone) that is invariably observed with α-olefins. Furthermore, the cooligomer synthesized was isotactic and optically active. The synthesis of an atactic polymer with both 1,4- and 1,5-keto groups in the backbone starting from cyclopentene and carbon monoxide has been reported previously (European Patent Publication No. 516, 238 and E. Amevor et al., Chimica 1993, 47, 283).

The type of catalyst that was used to achieve the isotactic copolymers described herein was a novel catalyst that, in its broadest embodiment, comprises palladium, an optically active bidentate phosphine ligand containing a rigid bridging group, such as phenylene, and chiral moieties on the phosphorus atoms (which are preferably phospholane moieties), and a borate anion. The bidentate ligand is a 1,2-bis(2,5-dialkylphospholano)benzene compound, which is included among the various chiral phospholanes described in M. J. Burk U.S. Pat. No. 5,171,892 which is incorporated herein by reference. The bidentate ligand is most preferably a 1,2-bis(2,5-dialkylphospholano)benzene compound, where the alkyl group contains from about one to three carbon atoms as exemplified by methyl (which is preferred), ethyl, and isopropyl. The borate anion can be boron tetrafluoride.

The preferred catalyst used for the alternating copolymerization of olefins with carbon monoxide, as mentioned before, was [Pd(Me-DUPHOS)(MeCN)$_2$](BF$_4$)$_2$ (abbreviated "1" hereinbelow). It can be prepared in situ by codissolving a 1:1 molar ratio of [Pd(MeCN)$_4$](BF$_4$)$_2$ and a Me-DUPHOS (See M. J. Burk et al., J. Amer. Chem. Soc. 1993, 115, 10125) enantiomer in a nitromethane/methanol mixture. The compound 1 could be isolated from a nitromethane solution in high yield (96%). Its $^{31}$P{$^1$H} NMR spectrum in CD$_3$NO$_2$ exhibited a single resonance at 83.66 ppm, and its elemental analysis was consistent with the structure shown. The copolymerization reactions using the cation 1, which is shown in the following FIGURE, were carried out at 30°–70° C.:

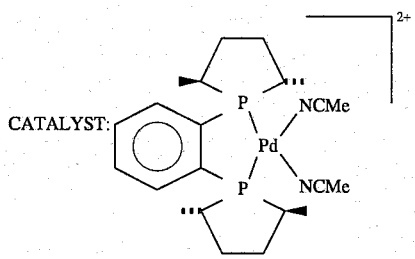

Compound 1 catalyzed the alternating copolymerization of carbon monoxide with α-olefins, such as propylene, 1-butene, 1-heptene, and allylbenzene. The formed propylene-carbon monoxide (P—CO), 1-butene-carbon monoxide (B—CO), 1-heptene-carbon monoxide (H—CO), and allylbenzene-carbon monoxide (A—CO) copolymers were alternating, exclusively head-to-tail, highly isotactic, and had a mixture of 1,4-ketone and spiroketal structures in the polymer backbone.

The structures of the polymers were characterized mainly by IR and NMR spectroscopy and were supported by elemental analysis results as will be further described hereinbelow.

The solid state $^{13}$C-NMR spectra of the P—CO and B—CO copolymers exhibited resonances at 114.3 and 113.8 ppm, respectively, due to the ketal carbons of the spiroketal repeating units in the polymer backbones. The weak resonances at 211.4 ppm for the P—CO copolymer and at 211.9 ppm for the B—CO copolymer indicated the presence of keto groups in the both polymers in addition to the spiroketal repeating units. The IR spectra (KBr) of the P—CO and the B—CO copolymers showed strong C—O—C bands at 832 and 810 cm$^{-1}$, respectively. A moderate carbonyl absorbance at 1710 cm$^{-1}$ was also observed for both polymers. Similarly, the IR spectra of the H—CO and A—CO copolymers exhibited corresponding moderate absorptions at 1709 and 1706 cm$^{-1}$ and very strong bands at 825 and 816 cm$^{-1}$, respectively, due to the keto and spiroketal structures present in the polymer backbone. A CDCl$_3$ solution of the H—CO copolymer showed $^{13}$C-NMR resonances at 212.86, 45.27, 44.70, 31.84, 31.35, 26.58, 22.43, and 14.01 ppm due to the —CH(n—C$_5$H$_{11}$)—CH$_2$—CO— units and absorbances at 113.61, 44.12, 40.75, 32.48, 29.00, 28.20, 22.65, and 14.10 ppm due to the spiroketal repeating units in the polymer. The solid state $^{13}$C-NMR spectrum of the A—CO copolymer exhibited resonance absorptions at 210.86 (weak) and 113.78 (strong) ppm attributable to the keto and spiroketal units in the main chain of the polymer.

It is known that α-olefin-CO copolymers with spiroketal units can be converted to pure poly(1,4-ketone)s upon treatment with acidic solvents such as 1,1,1,3,3,3-hexafluoroisopropanol. Thus, P—CO, B—CO, H—CO, and A—CO copolymers with only 1,4-keto groups were obtained after reprecipitation from the polymer solutions in either (CF$_3$)$_2$CHOH or a (CF$_3$)$_2$CHOH/CHCl$_3$ mixture into methanol. Unlike the poly(spiroketal/1,4-ketone) copolymers, the resultant polymers had no C—O—C IR absorptions at 810–830 cm$^{-1}$ range while the carbonyl stretching band at about 1710 cm$^{-1}$ was dramatically intensified. Additionally, no spiroketal $^{13}$C-NMR resonances were detected at about 113 ppm.

Under certain conditions, it has been observed the facile interchange between 1,4-ketone and spiroketal repeating units in the α-olefin-CO copolymers even in the absence of any added metal catalyst. For instance, the B—CO copolymer as formed contained mainly spiroketal units. Dissolution of the copolymer in CDCl$_3$ caused its complete conversion to poly(1,4-ketone) and its $^{13}$C-NMR spectrum exhibited a carbonyl resonance at 212.7 ppm but no ketal absorbance at about 113 ppm. The polymer solution was then concentrated and the polymer was precipitated out by the addition of methanol. The resultant precipitate was then washed with methanol and dried under vacuum at ambient temperature. The solid state $^{13}$C-NMR spectrum of this material showed a resonance at 113.78 ppm clearly indicating the reisomerization of 1,4-keto groups to spiroketal units. In another experiment, a sample of solid H—CO copolymer, which was mainly poly(1,4-ketone), containing small amount of spiroketal units was monitored periodically by running a $^{13}C\{^1H\}$NMR spectrum of a portion of it in CDCl$_3$. Over a period of eleven days at ambient temperature, the percentage of spiroketal units in the copolymer sample was found to increase significantly. It should be noted that, unlike the B—CO copolymer, the H—CO poly(spiroketal/1,4-ketone) copolymer was stable in CDCl$_3$ and the ratio of spiroketal versus keto units did not change significantly over seven days in solution as monitored by $^{13}$C-NMR spectroscopy. Furthermore, the pure A—CO poly(1,4-ketone) copolymer, formed by precipitation from a $(CF_3)_2$CHOH/CHCl$_3$ mixture, was found to reisomerize in pure chloroform solution to the polyspiroketal structure. At high concentrations, the isomerization reaction caused eventual precipitation of a polymer with predominantly spiroketal repeating units due to the lower solubility of this material. The solid state $^{13}C\{^1H\}$NMR spectrum of the precipitated poly(spiroketal/1,4-ketone)showed resonances at 210.86 (weak), 141.44, 128.91 (br), 113.78 (strong), 46.97, 41.25, 36.01 ppm, and the polymer was essentially identical to the A—CO poly(spiroketal/1,4-ketone) copolymer initially synthesized in a CH$_3$NO$_2$/CH$_3$OH mixture. At a lower concentration (4 mg/ml), the keto/spiroketal isomerization proceeded homogeneously and no precipitate was observed. Thus, the rate of the isomerization could also be followed by periodic measurement of the molar optical rotation of the polymer in solution. There was a change in molar optical rotation versus time starting with pure A—CO poly(1,4-ketone) copolymer in chloroform solution at ambient temperature with the value decreasing from +165° to +9° in thirty-six days. The initial very slow isomerization appears to indicate that the formation of first spiroketal repeating units from the 1,4-keto structure was the rate-determining step in the reaction.

In general, it appears that in the alternating α-olefin-CO copolymers the spiroketal structure was more stable in the solid state than in solution. Furthermore, the stability of the spiroketal structure in organic solvents like chloroform increased dramatically with an increase in the size of the alkyl substituent. Thus, the spiroketal structure was only detected in the solid state for the P—CO and B—CO copolymers but was observed and found to be stable in both the solid state and in chloroform solution for the H—CO and A—CO copolymer. Indeed, for the last copolymer, the spiroketal structure was thermodynamically favored over the 1,4-ketone structure in solution. It should be noted that the polymer samples used for the 1,4-ketone-spiroketal interchange studies were virtually free of any catalyst residues. For example, elemental analysis revealed that the A—CO copolymer had 0.031% Pd.

A possible mechanism for the interchange between 1,4-ketone and spiroketal repeating units in an α-olefin-CO copolymer has been postulated. It appears that a more regio/stereoregular disposition of the carbonyl groups favor the tandem cyclization to the spiroketal structure since this repeating unit has only been observed for α-olefin-CO copolymers with high regio- and stereoregularity.

Finally, the α-olefin-CO copolymers with spiroketal repeating units show very different physical properties and chemical reactivities compared to the corresponding pure poly(1,4-ketone)s. For instance, the B—CO and H—CO poly(spiroketal/1,4-ketone) copolymers were insoluble in acetone while the pure poly(1,4-ketone) isomers were completely soluble. The P—CO copolymer containing mostly spiroketal units was insoluble in most common organic solvents, such as chloroform and methylene chloride, and was completely inert towards strong reducing agents such as LiAlH$_4$. The material was recovered unchanged after a suspension of the copolymer in dry tetrahydrofuran (THF) containing excess LiAlH$_4$ was stirred at 70° C. for three days. In contrast, the pure P—CO poly(1,4-ketone) was soluble in chloroform and methylene chloride, and complete reduction of the carbonyl groups by LiAlH$_4$ occurred in THF in less than twelve hours at 63° C.

As described above, α-olefin-CO copolymers with spiroketal units can be converted to pure poly(1,4-ketone)s upon treatment with acidic solvents such as 1,1,1,3,3,3-hexafluoroisopropanol. The pure poly(1,4-ketone)s thus formed showed a single carbonyl absorptions at 214–218 ppm in the $^{13}$C-NMR (($CF_3)_2$CHOH/CDCl$_3$) spectra due to an exclusive head-to-tail structure. Single dominant resonances for the CH$_2$ (about 43–45 ppm) and CH (about 41–48 ppm) groups in the polymer backbone support the presence of high stereoregularity in the polymers.

The high tacticity of the polymers was also supported by their $^1$H-NMR spectra which exhibited proton couplings among the adjacent CH and CH$_2$ groups in the polymer backbone; only broad absorptions were observed for the corresponding atactic α-olefin-CO copolymers. For example, a solution of the P—CO copolymer in $(CF_3)_2$CHOH showed $^1$H-NMR resonances at 3.19–3.11 (2H, m), 2.80 (1H, d, J=15.2 Hz), and 1.20 (3H, d, J= 6.5 Hz) ppm. While the resonance at 1.20 ppm was clearly due to the methyl group in the repeating unit, —CH(CH$_3$)—CH$_2$—CO—, the coupling constants indicated that the H-atom absorbing at 2.80 ppm was not coupled with the CH$_3$ group and, therefore, was not the methine CH group in the polymer backbone. Indeed, $^1$H-NMR homo-decoupling experiments showed that the H-atom at 2.80 ppm was one of the CH$_2$ hydrogens and that the CH hydrogen resonated at 3.11–3.19 ppm, overlapping with the absorption of the second H-atom of the CH$_2$ group. Thus, no change was observed for the absorption at 2.80 ppm upon irradiation of the methyl group at 1.20 ppm. On the other hand, both the resonances at 2.80 and 1.20 ppm turned into singlets when the absorbances at 3.11–3.19 ppm were irradiated. The two H-atoms of the CH$_2$ group are diastereotopic and therefore non-equivalent. The $^1$H-coupled $^{13}$C-NMR spectrum of the polymer exhibited absorptions at 217.49 (s), 44.31 (t, J=127 Hz), 40.93 (d, J=130 Hz), and 15.17 (q, J=127 Hz) ppm due to the C=O, CH$_2$, CH, and CH$_3$ groups of the —CH(CH$_3$)—CH$_2$—CO— units in the copolymer. The above NMR parameters are in accord with those reported by Consiglio.

Similarly, the B—CO poly(1,4-ketone) copolymer showed $^1$H-NMR(CDCl$_3$) absorbances at 2.98 (1H, dd, J=17.6, 10.3 Hz), 2.88 (1H, m, br), 2.66 (1H, d, J=17.6 Hz), 1.57 (1H, m), 1.36 (1H, m), 0.86 (3H, t, J=7.3 Hz) ppm. The resonances at 2.98 and 2.66 ppm were attributable to the two diastereotopic methylene protons adjacent to the carbonyl in the polymer main chain and the resonance at 2.88 ppm was due to the backbone methine protons. It should be noted that the coupling constants between the two backbone methylene protons and the adjacent methine proton were substantially different with one being fairly large (10.3 Hz) and the other being too small to be detected. The absorptions at 1.57 and 1.37 ppm were clearly due to the other CH$_2$ group next to the methyl which resonated at 0.86 ppm. The $^1$H-coupled $^{13}$C-NMR{2:1 (v/v) CDCl$_3$/$(CF_3)_2$CHOH} spectrum of the polymer exhibited absorbances at 216.79 (s), 47.40 (d, J=132 Hz), 43.79 (t, J=127 Hz), 24.44 (t, J=129 Hz), 10.58 (q, J=126 Hz) due to the C=O, CH, CH$_2$ (next to the carbonyl), CH$_2$ (next to the methyl), and CH$_3$ groups of the —CH$_2$—CH(CH$_2$CH$_3$)—CO—repeating units of the polymer.

The $^1$H-NMR(CDCl$_3$) spectrum of the H—CO poly(1,4-ketone) copolymer showed resonances at 2.92 (2H, m, br), 2.68 (1H, d, J=16.5 Hz), 1.49 (1H, br), 1.25 (7H, br), 0.88 (3H, t, br) ppm due to, respectively, the two overlapping protons from both the backbone CH$_2$ and CH groups, the other diastereotopic proton of the backbone CH$_2$, the one diastereotopic proton of the side chain CH$_2$ adjacent to the methine group, the rest of the methylene protons in the side chain, and the CH$_2$ protons in the —CH$_2$—CH(—(CH$_2$)$_4$CH$_3$)—CO— repeating units of the polymer. The $^1$H-coupled $^{13}$C-NMR{2:1 (v/v) CDCl$_3$/(CF$_3$)$_2$CHOH} spectrum exhibited absorptions at 216.22 (s), 45.93 (d, J=131 Hz), 44.25 (t, J=128 Hz), 31.77 (t, J=127 Hz), 31.29 (t, J=127 Hz), 26.68 (t, J=126 Hz), 22.36 (t, J=125 Hz), 13.62 (q, J=124 Hz) due to, respectively, the C=O, CH, CH$_2$ groups in the backbone, the four methylene units in the side chain, and CH$_2$ groups.

The solution NMR spectra of pure A—CO poly(1,4-ketone) copolymer were obtained using a mixture of CDCl$_3$/(CF$_3$)$_2$CHOH as the solvent due to the keto/spiroketal structural isomerization of the polymer in pure CDCl$_3$. The use of 1,1,1,3,3,3-hexafluoroisopropanol completely inhibited the isomerization reaction and therefore enabled us to closely examine the degree of regio- and stereoregularity of the polymer. The solution of pure A—CO poly(1,4-ketone) copolymer, (—CH$_2$—CH(CH$_2$Ph)—CO—)$_n$, in a 1:1 (v/v) (CF$_3$)$_2$CHOH/CDCl$_3$ mixture showed $^1$H-NMR absorbances at 7.14 (3H, m), 6.95 (2H, d, J=7.0 Hz) ppm due to the phenyl groups, resonances at 2.99 (1H, m), 2.66 (1H, dd, J=13.8, 6.2 Hz), 2.33 (1H, dd, J=13.8, 7.9 Hz) ppm due to the backbone CH and CH$_2$ groups, and an absorption at 2.51 (2H, m) due to the benzylic protons. The $^1$H-coupled $^{13}$C-NMR spectrum of the polymer exhibited resonances at 214.65 (s), 47.87 (d, J=132 Hz), 44.31 (t, J=127 Hz) ppm due to the C=O, backbone CH and CH$_2$ groups, resonances at 138.10 (s), 129.10 (d, J=160 Hz), 128.95 (d, J=160 Hz), 127.11 (d, J=167 Hz) ppm attributable to the phenyl groups, and absorption at 37.22 (t, J=130 Hz) due to the benzylic carbons.

The high tacticity of the polymers also led to high crystallinity and reduced solubility in organic solvents. For example, the tactic P—CO poly(1,4-ketone) was found to be insoluble in THF although its atactic analog was soluble.

The P—CO, B—CO, H—CO, and A—CO copolymers synthesized appear to be isotactic since optically active materials were obtained when enantiomerically pure 1 was used as the catalyst. Syndiotactic α-olefin-CO copolymers should only exhibit vanishingly small optical activity. The molecular weights and molar optical rotations (the latter measured in both CHCl$_3$ and (CF$_3$)$_2$CHOH) of the optically active, isotactic poly(1,4-ketone)s are given in the Examples which follow below. The values of molar optical rotation, ([Φ]$_D$), of the chiral copolymers were significantly affected by the solvent used and even the sign of [Φ]$_D$ for the P—CO and B—CO copolymers changed upon a change of solvent. Furthermore, the molar optical rotation of the P—CO copolymer in (CF$_3$)$_2$CHOH was dependent on the concentration, with [Φ]$_D$ increasing from 16° to 22° when the solution concentration was increased from 1.78 mg/ml to 18.1 mg/ml. The reason for the dramatic solvent effect on optical rotation remains unclear. The possibility that the presence of strong hydrogen bonds between the carbonyl oxygens in the polymer backbone and the (CF$_3$)$_2$CHOH may disrupt certain polymer conformational states that may otherwise contribute to the molar rotation in a less interacting solvent such as CHCl$_3$ appears unlikely. For example, a similar effect was also observed for the optically active, atactic, alternating P—CO copolymer possessing a mixture of head-to-head, head-to-tail, and tail-to-tail arrangements in the polymer backbone. It was shown earlier that the optical rotation exhibited by the latter polymer in CHCl$_3$ was primarily due to the presence of stereogenic tertiary carbon centers in the polymer backbone and not due to restricted conformational states.

The molar optical rotations are the values for pure poly(1,4-ketone)s and the presence of spiroketal units in the polymers will change the numbers. For example, both H—CO and A—CO copolymer samples containing spiroketal units were found to have a lower [Φ]$_D$ values compared to the corresponding pure poly(1,4-ketone) isomers. In CHCl$_3$, the molar optical rotation of the poly(1,4-ketone)s showed only a slight temperature dependance as was observed for the chiral, atactic P—CO and styrene-CO copolymers. The Δ[Φ]$_D$/ΔT values were −0.26°/°C. for the P—CO copolymer, −0.29°/°C. for the B—CO copolymer, and −0.34°/°C. for the H—CO copolymer. These values are comparable to those for model small molecules such as (S)-(+)-2-methylbutyric acid (−0.07°/°C.) and (S)-(+)-2-phenylbutyric acid (−0.41°/°C.). On the other hand, polymers whose chirality arise from restricted conformational states (e.g., helicity) tend to exhibit a fairly large decrease in optical rotation with increasing temperature since more random conformational states become accessible at higher temperatures. It is, therefore, reasonable to conclude that the optical rotations of the isotactic P—CO, B—CO, and H—CO copolymers in accordance with the present invention are due to the presence of stereogenic tertiary carbon centers in the polymer backbone with only a minimal contribution from polymer conformation.

The determination of enantioselectivity (% ee) in enantioselective polymerization reactions constitutes a very difficult problem. The most direct procedure for the analysis of enantiomeric purity of the repeating units in a chiral polymer is to degrade the polymer down to the repeating units and then determine the ratio of the R and S isomers present. Such a procedure is hard to carry out as it requires very efficient degradation of the polymer backbone, as well as the protection of the stereogenic centers in the polymer from being racemized during the degradation process. Thus, in accordance with the present invention an optically active NMR shift reagent was employed to resolve the two enantiomeric repeating units and to determine the degree of enantioselectivity (ee=[number of R repeating units—number of S repeating units]/total number of repeating units) in the isotactic α-olefin-CO poly(1,4-ketone)s. In the presence of tris[3-(trifluoromethylhydroxymethylene)-(+)-camphorato] Eu(III), the $^{13}$C{$^1$H}NMR(CDCl$_3$) spectrum of the optically active, isotactic P—CO poly(1,4-ketone), prepared using (−)-(R, R)-Me-DUPHOS as the ligand, exhibited only dominant singlets. However, all four singlets turned into "doublets" when the corresponding racemic P—CO poly(1,4-ketone) was employed. The carbonyl resonance, as expected, showed the largest separation between the two peaks. It is very clear from the above study that the degree of enantioselectivity in the optically active, isotactic P—CO copolymer was >90% (the % ee may actually be much higher but the resolution in our NMR spectra does not allow us to make that claim) and the possible presence of heterochiral chains (i.e., chains with . . . RRRRRRRRRSSSSS . . . ) can be excluded.

The high degree of isotacticity and enantioselectivity in the optically active, isotactic poly(1,4-ketone)s was further supported by the structures of the 1,4-polyalcohols derivatized from the polyketones. For example, the isotactic P—CO polyketone copolymer was completely hydrogenated by LiAlH$_4$ in dry THF to the polyalcohol, (—CH$_2$—CH(CH$_3$)—CH(OH)—)$_n$. The resultant polymer showed two strong bands at 3405 cm$^{-1}$ and 1017 cm$^{-1}$ in its IR spectrum due to O—H and C—O stretches. The absence of any absorption at about 1710 cm$^{-1}$ clearly indicated that the carbonyl groups of the P—CO copolymer were quantitatively reduced to the alcohol functionality. The $^1$H-NMR spectrum of the polyalcohol exhibited absorbances at 4.87 (1H, s), 3.58–3.68 (1H, br), 1.62–1.75 (2H, br), 1.15–1.35 (1H, m, br), 0.94 (3H, m) due to OH, CH (adjacent to OH), CH$_2$, CH (adjacent to CH$_3$), and CH$_3$ groups, respectively. The $^{13}$C{$^1$H}-NMR absorptions of the polymer due to the CH (adjacent to OH), CH (adjacent to CH$_3$) & CH$_2$, and CH$_3$ groups were observed at 72.18–75.15 (m), 36.82–39.36 (m), and 17.13, 16.37, 15.20, 14.53 ppm. It seems that the $^{13}$C-NMR chemical shift of the methyl group was sensitive to the configuration of the stereogenic tertiary carbon attached to it and the configurations of the three adjacent stereogenic tertiary carbons bearing hydroxyl or methyl groups. The four nearly equally intense methyl resonances at 17.13, 16.37, 15.20, and 14.53 ppm can be explained by assuming (a) that virtually all the asymmetric tertiary carbons attached to methyl groups had the same configuration as a result of very high enantioselectivity in the formation of the parent isotactic P—CO poly(1,4-ketone) and the complete retention of their configuration during reduction and (b) that the two asymmetric tertiary carbons bearing hydroxyl groups adopted random configurations (either R or S) as a result of a non-enantioselective attack on the carbonyl groups of the P—CO copolymer by LiAlH$_4$. The retention of configuration of the tertiary carbons attached to the methyl groups was indicated by the optical activity of the polyalcohol. For example, the poly(1,4-alcohol) synthesized from the isotactic P—CO poly(1,4-ketone) ([Φ]$_D^{25}$=+49°, CHCl$_3$) had a molar optical rotation [Φ]$_D^{25}$=+12.8° in CH$_3$OH.

The above assumption was further supported by the observation of eight $^{13}$C-NMR resonances (at 17.07, 16.78, 16.31, 16.00, 15.18, 14.42, 13.79, 13.64 ppm) for the methyl group in the repeating units of the poly(1,4-alcohol) prepared by the reduction of an atactic, achiral, exclusive head-to-tail, alternating P—CO poly(1,4-ketone). Eight corresponds to eight pairs of tetraads (R$_1$R$_2$R$_3$R$_4$/S$_1$S$_2$ S$_3$S$_4$, R$_1$R$_2$R$_3$S$_4$/S$_1$S$_2$ S$_3$R$_4$, R$_1$R$_2$S$_3$R$_4$/S$_1$S$_2$R$_3$S$_4$, R$_1$S$_2$R$_3$R$_4$/S$_1$R$_2$S$_3$S$_4$, S$_1$R$_2$R$_3$R$_4$/R$_1$S$_2$S$_3$S$_4$, R$_1$R$_2$S$_3$S$_4$/S$_1$S$_2$R$_3$R$_4$, R$_1$S$_2$S$_3$R$_4$/S$_1$R$_2$R$_3$S$_4$, and R$_1$S$_2$R$_3$S$_4$/S$_1$R$_2$S$_3$R$_4$) for four different stereogenic tertiary carbons with each randomly adopting either the R or the S configuration.

Cis-2-butene was allowed to cooligomerize with CO in the presence of 1 with (−)-(R,R)-Me-DUPHOS ligand as the catalyst. The structure of the resultant alternating cooligomer was characterized by IR and NMR spectroscopy. The IR spectrum of the oligomer exhibited a strong band at 1705 cm$^{-1}$ due to the carbonyl groups in the polymer chain. Single dominant resonances at 213.73, 45.63, 38.57, 26.91, 16.75 ppm in the $^{13}$C{$^1$H}-NMR spectrum indicated both the presence of an exclusive head-to-tail arrangement and the presence of high stereoregularity in the oligomer backbone. The proton coupled $^{13}$C-NMR spectrum of the cooligomer showed absorptions at 213.73 (s), 45.63 (d, J=129 Hz), 38.57 (t, J=125 Hz), 26.91 (t, J=130 Hz), 16.75 (q, J=127 Hz) ppm clearly due to the C=O, CH, CH$_2$ (adjacent to carbonyl), CH$_2$ (adjacent to CH), and CH$_3$ groups, respectively. The $^1$H-NMR resonances of the cooligomer at 2.58 (1H, m), 2.48 (2H, t, br), and 1.05 (3H, d, J=6.7 Hz) ppm were due to the corresponding CH, CH$_2$ (adjacent to carbonyl), and CH$_2$ groups, and those at 1.86 (1H, m) and 1.56 (1H, m) ppm were attributable to the two diastereotopic protons of the CH$_2$ groups adjacent to the CH groups. The cooligomer appears to be isotactic and was found to be optically active with molar optical rotation [Φ]$_D^{25}$=−22.2° (2-propanol, c=13 mg/ml). Epimerization of the poly(1,5-ketone) with sodium 2-chlorophenolate in 2-chlorophenol at 100° C. for forty-eight hours caused substantial broadening of its $^1$H-NMR absorbances and the $^{13}$C{$^1$H}-NMR resonances of the oligomer turned multiplets at the corresponding frequencies.

Three end groups: —C(O)—CH$_2$CH$_2$CH$_2$CH$_3$, —C(O)—CH(CH$_3$)CH$_2$CH$_3$, and —C(O)—C(CH$_3$)=CH—CH$_3$ were identified by NMR spectroscopy. The $^1$H NMR spectrum of the oligomer showed small absorbances at 1.30 (sextet, J=7.3 Hz) and 0.90 (t, J=7.3 Hz) ppm due to the ethyl end of —C(O)—CH$_2$CH$_2$CH$_2$CH$_3$ and resonances at 6.82 (q, J=6.8 Hz) and 1.73 (s) ppm due to CH and CH$_3$ (adjacent to carbonyl) groups of the —C(O)—C(CH$_3$)=CH—CH$_2$ terminus. The absorption due to the methyl (adjacent to CH$_2$) of the —C(O)—CH(CH$_3$)CH$_2$CH$_3$ end group overlapped with the CH$_3$ of the —C(O)—CH$_2$ CH$_2$CH$_2$CH$_3$ terminus. The presence of the —C(O)—C(CH$_3$)=CH—CH$_3$ end group was also indicated in the $^1$H-coupled $^{13}$C-NMR spectrum by small resonances at 201.36 (s), 138.44 (s), 138.15 (d, J=158 Hz) ppm due to the carbonyl and the two vinylic carbons. The ten sp$^3$ carbons of the three terminal groups resonated at 41.13, 34.83, 28.33, 26.32, 24.25, 22.86, 14.94, 14.23, 11.85, 11.15 ppm. The molecular weight of the oligomer was calculated based on the $^1$H-NMR spectrum to be M$_n$=600 (number of repeating units=7).

The novel poly(1,5-ketone) structure formed in the alternating cooligomerization of cis-2-butene with carbon monoxide was presumably due to metal migration from secondary alkyl to the adjacent methyl group after the insertion of the cis-2-butene monomer into a Pd-acyl intermediate. The isomerization can occur by a β-H abstraction step followed by reinsertion of the resultant olefin in the opposite sense. The isomerization from a branched alkyl to a linear alkyl complex has been observed previously and the reduction of steric interaction between the bulky phosphine ligand and the alkyl group on the metal would be the driving force.

The cooligomerization reaction appears to be initiated by a Pd—H species, the formation of which in methanol has been described previously. Initiation by Pd—OCH$_2$ species is ruled out since no terminal methoxy group was detected by NMR spectroscopy. The —C(O)—CH$_2$CH$_2$CH$_2$CH$_3$ end group was formed through the insertion of cis-2-butene into a Pd—H species followed by metal migration and CO insertion. The formation of the —C(O)—CH(CH$_3$)CH$_2$CH$_3$ terminus may result either from the insertion of 2-butene into a Pd—H bond followed by CO insertion or from the proton cleavage of a Pd—CH (CH$_3$)—CH(CH$_3$)—COR intermediate. However, the —C(O)—C(CH$_3$)=CH—CH$_3$ terminus can only arise through β-H abstraction from a Pd—CH(CH$_3$)—CH(CH$_3$)—COR intermediate.

It should also be pointed out that control experiments showed that compound 1 in CD$_3$NO$_2$ at 70° C. was able to catalyze the isomerization of cis-2-butene to the unreactive trans-2-butene but not to 1-butene. This was the reason for the absence of any 1,4-keto repeating units in the cooligomer that were derived from the reaction of 1-butene formed in situ.

In accordance with another embodiment of the present invention, it was found that the type of highly isotactic polyketones previously described, when mixed as their respective (+) and (−) enantiomers, formed a racemic mixture having a dramatically higher melting point. This strong preference of the one polyketone with a given chiral sense for the tertiary carbons in the main chain with a second polyketone with the opposite chiral sense even occurs if the pendant alkyl groups in each are different, although preferential complexation occurs with a copolymer containing the same pendant alkyl group.

Chiral and steric recognitions play critical roles in selective binding and resultant high stereo- and enantioselectivity in chemical reactions mediated by bioactive macromolecules such as enzymes and nucleic acids. While selective interactions between small, chiral, organic compounds have been studied extensively, there are very few documented examples (mostly polyesters) of chiral recognition between macromolecules possessing main-chain chirality. Such interactions must be responsible, for example, in the selective biodegradation of polymers of given chirality and a good understanding of the phenomenon is important in the proper design of biocompatible/biodegradable polymers that may be used as implants. In accordance with one embodiment of the present invention, we report the presence of both strong chiral and steric recognitions between optically active, highly isotactic, alternating α-olefin-carbon monoxide copolymers with 1,4-keto groups in the backbone and their effect on both the physical properties and chemical reactivity of the polymers. Thus, an alternating α-olefin-carbon monoxide copolymer with a given chiral sense for the tertiary carbons in the main chain can distinguish (a) between the two possible chiral senses for the tertiary carbons in the main chain of a second α-olefin-carbon monoxide copolymer even when the latter has a different pendant alkyl group and (b) between the length of the pendant alkyl group in two different copolymers whose tertiary carbons have the same chiral sense. This combination of chiral and steric recognition is believed to be without precedent.

The molecular weights and molecular weight distributions of the substantially isotactic, optically active copolymers of the present invention are shown in Table 1 which follows:

TABLE 1

Molecular Weights[a] and Melting Points[b] of Chiral, Isotactic, Alternating α-Olefin-Carbon Monoxide Poly(1,4-ketone)s.

| Copolymer | Molecular Weight, $M_p$ ($M_w/M_n$) | Melting Point ($T_m$) |
|---|---|---|
| Propylene-CO chiral (+) or (−) | $3.6 \times 10^4$ (2.4) | 171° C. |
| Propylene-CO racemic[c] | $3.6 \times 10^4$ (2.4) | 239° C. |
| 1-Butene-CO chiral (+) or (−) | $3.8 \times 10^4$ (2.8) | 137° C. |
| 1-Butene-CO racemic[c] | $3.8 \times 10^4$ (2.8) | 265° C. |
| Allylbenzene-CO chiral (+) or (−) | $7.1 \times 10^3$ (2.0) | 62° C. |
| Allylbenzene-CO racemic[c] | $7.1 \times 10^3$ (2.0) | 169° C. |

[a]Molecular weights and molecular weight distributions were measured by GPC relative to polystyrene standards.
[b]Melting points were determined by DSC.
[c]The racemic, isotactic α-olefin-carbon monoxide copolymer samples were prepared by dissolving a 1:1 mixture of the (+) - and (−)-copolymers in a 3:1 (v/v) $CHCl_3/(CF_3)_2CHOH$ mixture and precipitating into $CH_3OH$.

Based on the NMR spectra described previously, the degree of stereoregularity (percentage of isotactic RRR/SSS triad) in the propylene-carbon monoxide (P—CO), 1-butene-carbon monoxide (B—CO), and allylbenzene-carbon monoxide (A—CO) copolymers was found to exceed 95% and in the case of isotactic P—CO copolymer, the enantiomeric excess (ee=[number of R repeating units—number of S repeating units]/total (R+S) repeating units) in the either R- or S- copolymer has been determined to be >90%.

Enantiomerically pure (+ or −), chiral, isotactic P—CO copolymer showed a melting point of 171° C. Most remarkably, the precipitation of a 1:1 (weight ratio) mixture of (+)—P—CO/(−)—P—CO copolymers from $CHCl_3/(CF_3)_2CHOH$—$CH_3OH$ solution led to the formation of a crystalline, racemic (±)—P—CO stereocomplex with a much higher melting temperature ($T_m$=239° C.). The same effect was also observed for the other isotactic α-olefin-carbon monoxide copolymers and the results are summarized in Table 1, above. Dipolar attraction between neighboring carbonyl groups (i.e., C=O——C=O) appears not to be the cause for the large difference in melting points between the enantiomerically pure α-olefin-carbon monoxide copolymers and their corresponding racemic stereocomplexes since virtually identical IR(KBr) C=O stretching frequencies (1706 cm$^{-1}$) were observed for both chiral and racemic B—CO copolymers.

The dramatic increase in the melting points for the racemic stereocomplexes appears to be due to the increase in the compactness of the polymer crystalline phases. This hypothesis is supported by the results of the X-ray powder diffraction (XRD) measurements of the copolymer samples. For example, the XRD spectra of the enantiomerically pure (−) and racemic (±) P—CO copolymer samples were found to be quite distinct. The former exhibited two principal diffraction peaks at 16.5° (d-spacing=5.37Å) and 19.1° (d-spacing=4.64Å), while the corresponding peaks in the latter were at 11.4° (d-spacing=7.76Å) and 19.4° (d-spacing=4.57Å). The difference in the crystal structure between the two can be explained by assuming the incorporation of a layer of (R)-P—CO copolymer chains in between two adjacent layers of (S)-P—CO copolymer chains and vice versa in the (± or R/S)-stereocomplex crystal lattice. This will be expected to significantly affect only one of the d-spacings as was observed. Such an arrangement in the racemic crystallite results in the overall increase in the degree of packing, in comparison to crystallites of either enantiomerically pure copolymers, and an increase in melting point can be anticipated. The melting point increase was observed not only in a 1:1 (weight ratio) mixture of (+)- and (−)-, isotactic α-olefin-carbon monoxide copolymers, but also in a nonequivalent mixtures. For instance, DSC measurements showed that (+)-B—CO copolymer mixed with either 50% or 20% (−)-B—CO copolymer had the same, single melting point (265° C.); a separate melting point for the pure (+)-B—CO copolymer was not observed. Clearly, during the crystallization, (±)-B—CO stereocomplex crystals were formed preferentially even in nonequimolar blends and, moreover, stereocomplexation strongly inhibited the homocrystallization of the (+)-B—CO copolymer.

Chiral recognition and the resultant selective stereocomplexation between two different, isotactic α-olefin-carbon monoxide copolymers were also investigated and the results are summarized in Table 2 which follows:

TABLE 2

Melting Points[a] of Chiral, Isotactic, Alternating α-Olefin-Carbon Monoxide Poly(1,4-ketone) Blends

| Polyketone Blend | 1 (+)-P-CO[b,c]<br>1 (+)-B-CO | 1 (+)-P-CO[b,c]<br>1 (−)-B-CO | 1 (+)-P-CO[b,c]<br>1 (−)-P-CO<br>1 (+)-B-CO | 1 (+)-B-CO[b,c]<br>1 (−)-B-CO<br>1 (+)-P-CO |
|---|---|---|---|---|
| Melting Point ($T_m$) | 137° C.<br>175° C. | 230° C. | 239° C. | 265° C. |

[a]Melting points were measured by DSC.
[b]The ratios were molar ratios of the repeating units: P-CO: propylene-CO; B-CO:1-butene-CO.
[c](+) or (−): sign of the molar optical rotation in CHCl$_3$.

The data in Table 2 clearly show that the stereocomplexation between a (+)/(−) pair of two different, isotactic α-olefin-carbon monoxide copolymers occurred preferentially over the homocrystallization of the individual enantiomerically pure copolymers, and the stereocomplexation between the (+)/(−) pair of the same copolymer took place preferentially over the complexation between a (+)/(−) pair from two different copolymers. For example, while a 1:1 (molar ratio of repeating units) mixture of the (+)-P—CO and (+)-B—CO copolymers exhibited two melting points at 137° C. and 171° C. corresponding to the homocrystallites of (+)-B—CO and (+)-P—CO copolymers, respectively, the 1:1 (molar ratio of repeating units) mixture of the (+)-P—CO and (−)-B—CO copolymers showed only a single melting temperature at 230° C., indicating the formation of a new stereocomplex. On the other hand, a 1:1:1 (molar ratio of repeating units) mixture of (+)-P—CO/(−)-P—CO/(+)-B—CO copolymers and a 1:1:1 mixture of (+)-B—CO/(−)-B—CO/(+)-P—CO copolymers exhibited single melting points at 239° C. and 265° C., respectively, due to the formation of corresponding racemic (±)-P—CO and racemic (±)-B—CO crystallites. At the same time, the homocrystallization of (+)-B—CO copolymer in the former and (+)-P—CO copolymer in the latter, as well as stereocomplexation between (−)-P—CO and (+)-B—CO copolymers and between (−)-B—CO and (+)-P—CO copolymers were strongly inhibited.

The above observations clearly indicate that an alternating α-olefin-carbon monoxide copolymer with a given chiral sense for the tertiary carbons in the main chain strongly prefers to form a complex with second α-olefin-carbon monoxide copolymer with opposite chiral sense for the tertiary carbons in the main chain, even when the latter has a different pendant alkyl group. Given a choice between two different copolymers both with opposite chiral sense for the tertiary carbons, preferential complexation occurs with the copolymer with an identical pendant alkyl group. Thus, the chiral α-olefin-carbon monoxide copolymers can discriminate on the basis of both chirality and sterics.

Finally, the chiral recognition between the enantiomerically pure, isotactic α-olefin-carbon monoxide copolymers not only had an effect on the physical properties but also had an influence on the chemical reactivity. For example, it has been earlier observed that over a period of 7 d, the chiral, isotactic, A—CO copolymer isomerized in CDCl$_3$ solution (concentration: 4 mg/ml) at ambient temperature to a polymer with predominantly spiroketal repeating units. This transformation was monitored by both NMR spectroscopy and optical rotation measurements. However, under identical reaction conditions, no isomerization was observed for a 1:1 mixture of the (+)- and (−)-A—CO copolymers over a period of 30 d. This change in reactivity was presumably due to the formation of a stereocomplex in solution which inhibited the 1,4-ketone/spiroketal isomerization reaction.

The present invention will be further understood by the Examples which follow.

GENERAL PROCEDURES USED IN EXAMPLES

Materials: C.P. grade chemicals were used as received unless otherwise stated. For example, (−)-1,2-bis((2R,5R)-2,5-dimethyl-phospholano)benzene (also termed "(R,R)-Me-DUPHOS)", as described in M. J. Burk et al., J. Amer. Chem. Soc. 1993, 115, 10125, (+)-1,2-bis((2S,5S)-2,5- dimethylphospholano)benzene (also termed "(S,S)-Me-DUPHOS"), as also described by Burk et al., and 1,2-bis(dicyclohexyl-phosphino)ethane were purchased from Strem Chemicals. The reagents (S)-(+)-2-methylbutyric acid, (S)-(+)-2-phenylbutyric acid, tris[3 -(trifluoromethyl-hydroxymethylene)-(+)-camphorato] Eu(III), and LiAlH$_4$ (1M solution in THF) were obtained from Aldrich. The catalyst, [Pd(MeCN)$_4$](BF$_4$)$_2$, was prepared according to the method described by R. R. Thomas et al., Inorg. Synth., 1989, 26, 128 and 1990, 28, 63. Nitromethane, THF, 1-heptene, and allylbenzene were dried over CaH$_2$ and either vacuum-transferred or vacuum-distilled. Methanol was treated with sodium methoxide and distilled.

General Methods: All catalyst solutions were prepared in a dry nitrogen-filled glove box. The copolymerization of olefins with carbon monoxide was performed under nitrogen atmosphere due to the sensitivity of the catalyst to air, and $^1$H-, $^{13}$C-, and $^{31}$P-NMR spectra were recorded on a Brucker AM300 FT-NMR spectrometer. The chemical shifts of $^1$H- and $^{13}$C-NMR resonances were referenced to internal tetramethylsilane (TMS) or to the solvent resonance at the appropriate frequency and those of $^{31}$P-NMR resonances were referenced to external phosphoric acid. Solid state $^{13}$C-NMR spectra and IR spectra were recorded on a Chemagnetics CMX300 FT-NMR spectrometer and a Perkin Elmer 1600 FT-IR spectrophotometer, respectively. Molecular weights of polymers were measured on a Water Associates liquid/gel permeation chromatograph using a Microstyragel column and a differential refractometer. Methylene chloride was used as the solvent and polystyrene standards were used to calibrate the instrument. Optical rotation measurements of chiral polymers were performed on a Perkin-Elmer 241 polarimeter using a sodium lamp. Elemental analysis of the catalyst and the polymers was carried out by Galbraith Laboratories, Inc.

EXAMPLE 1

This Example illustrates the isolation and structural characterization of the catalyst, [Pd(Me-DUPHOS)(MeCN)$_2$] (BF$_4$)$_2$.

A 1:1 molar ratio mixture of [Pd(MeCN)$_4$](BF$_4$)$_2$ (100 mg, 0.225 mmol) and (R,R)-Me-DUPHOS (69.0 mg, 0.225 mmol) was codissolved in 5 ml of dry nitromethane and the resultant solution was allowed to stir at ambient temperature under nitrogen for three hours. A solid precipitate was obtained after the solution was concentrated under vacuum followed by addition of diethyl ether. The palladium(II) complex (144 mg) was washed with Et$_2$O and dried under vacuum.

[Pd(Me-DUPHOS)(MeCN)$_2$](BF$_4$)$_2$: $^{31}$P{$^1$H}NMR (CD$_3$NO$_2$) (ppm): 83.66 (s). Anal. calcd for PdC$_{22}$H$_{34}$N$_2$P$_2$B$_2$F$_8$: C, 39.5; H, 5.1. Found: C, 39.4; H, 5.4.

EXAMPLE 2

This Example illustrates the preparation of optically active, isotactic, alternating propylene-carbon monoxide copolymer.

A solution containing 4.5×10$^{-2}$ mmol of [Pd(MeCN)$_4$](BF$_4$)$_2$ and 4.5×10$^{-2}$ mmol of (R,R)-Me-DUPHOS in 9 ml of a 2:1 (v/v) CH$_3$NO$_2$/CH$_3$OH mixture was placed in a Parr bomb under nitrogen and charged with 30 gm of propylene and 1500 psi of CO. The reaction mixture was stirred at 50° C. for twenty-three hours. The resultant white solid (7.0 gm) was washed with methanol and dried under vacuum. The formed polymer was found to have a mixture of 1,4-ketone and spiroketal repeating units in the polymer backbone. Reprecipitation of the poly (spiroketal/1,4-ketone) in (CF$_3$)$_2$CHOH/CH$_3$OH changed its structure to pure poly(1,4-ketone).

P—CO Poly(spiroketal/1,4-ketone) Copolymer: Solid state $^{13}$C{$^1$H}NMR (ppm): 211.4, 114.3, 41.8, 39.7 (br), 17.2, 14.1 (br). IR (KBr) (cm$^{-1}$): 1710, 832 (C—O—C). Anal. calcd for C$_3$H$_6$—CO: C, 68.6; H, 8.6. Found: C, 68.0; H, 8.6.

P—CO Pure Poly(1,4-ketone) Copolymer: Solid state $^{13}$C{$^1$H}NMR (ppm): 211.4, 44.4, 41.2, 16.7. IR(KBr): 1708 cm$^{-1}$. $^1$H-NMR ((CF$_3$)$_2$CHOH) (ppm): 3.11–3.19 (2H, m), 2.80 (1H, d, J=15.2 Hz), 1.20 (3H, d, J=6.5 Hz). $^1$H-NMR (CDCl$_3$) (ppm): 2.92–3.09 (2H, m), 2.53 (1H, d, J=17.3 Hz), 1.04 (3H, d, J=6.5 Hz). $^{13}$C{$^1$H}NMR (CDCl$_3$) (ppm): 212.42, 44.74, 40.04, 16.41. $^{13}$C{$^1$H}NMR{2:1 (v/v) CDCl$_3$/(CF$_3$)$_2$CHOH} (ppm): 217.27, 44.79, 41.08, 15.88. $^{13}$C-NMR ((CF$_3$)$_2$CHOH) (ppm): 217.49 (s), 44.31 (t, J=127 Hz), 40.93 (d, J=130 Hz), 15.17 (q, J=127 Hz). Molar optical rotation: [Φ]D$^{25}$=+49.0 (c=3.22 mg/ml, CHCl$_3$), [Φ]$_D^{25}$=−21° (c=18.1 mg/ml, (CF$_3$)$_2$CHOH). Molecular weight=3.6× 10$^4$ versus polystyrene standards, M$_w$/M$_n$=2.4.

The above copolymerization reaction was repeated using (S,S)-Me-DUPHOS as the ligand instead of the (R,R)-enantiomer. The resultant polymer was identical to the one formed with (R,R)-Me-DUPHOS as the ligand, except for the following molar optical rotation. Molar optical rotation: [Φ]$_D^{25}$=+22° (c=18.1 mg/ml, (CF$_3$)$_2$CHOH).

EXAMPLE 3

This Example illustrates the preparation of atactic, alternating propylene-carbon monoxide copolymer with exclusively head-to-tail arrangement in the polymer backbone.

A catalyst solution containing 0.112 mmol of [Pd(MeCN)$_4$](BF$_4$)$_2$ and 0.112 mmol of 1,2-bis(dicyclohexylphosphino) ethane in 3 ml of a 2:1 (v/v) CH$_3$NO$_2$/CH$_3$OH mixture was placed in a Parr bomb under nitrogen and charged with 40 gm of propylene and 1300 psi of CO. The reaction mixture was stirred at 40° C. for three days. The polymer (2.0 gm) formed was reprecipitated in CH$_2$Cl$_2$/CH$_3$OH, washed with methanol, and vacuum-dried.

Atactic, Head-to-Tail, Alternating P—CO Copolymer: $^1$H NMR (CDCl$_3$) (ppm): 2.98 (2H, br), 2.53 (1H, br), 1.06 (3H, br). $^{13}$C{$^1$H}NMR (CDCl$_3$) (ppm): 211.79, 44.20, 40.70, 16.45. Molecular weight=7200 versus polystyrene standards, M$_w$/M$_n$=2.9.

EXAMPLE 4

This Example illustrates the preparation of optically active, isotactic, alternating 1-butene-carbon monoxide (B—CO) copolymer.

The reaction was performed following a procedure analogous to the one employed for propylene, as described hereinabove. In the present reaction, 1-butene (22 gm) was used instead of propylene. The reaction was run at 34° C. for twenty hours. The formed white solid (7.1 gm) was washed with methanol and was dried in vacuo. The B—CO copolymer was found to have a mixture of 1,4-ketone and spiroketal units in the solid state and changed to pure poly(1,4-ketone) upon dissolution in CHCl$_3$ or after reprecipitation in (CF$_3$)$_2$CHOH/CH$_3$OH.

B—CO Poly(spiroketal/1,4-ketone) Copolymer: Solid state $^{13}$C{$^1$H}NMR (ppm): 211.90, 113.78, 45.93, 42.28, 22.96, 13.57. IR (KBr) (cm$^{-1}$): 1710, 810 (vs, C—O—C). Anal. calcd for C$_4$H$_8$—CO: C, 71.4; H, 9.5. Found: C, 71.0; H, 9.7. The B—CO Polyketone Copolymer: $^1$H-NMR (CDCl$_3$) (ppm): 2.98 (1H, dd, J=17.6, 10.3 Hz), 2.88 (1H, m, br), 2.66 (1H, d, J=17.6 Hz), 1.57 (1H, m), 1.36 (1H, m), 0.86 (3H, t, J=7.3 Hz). $^{13}$C{$^1$H}NMR (CDCl$_3$) (ppm): 212.73, 46.57, 44.26, 24.46, 11.35. $^{13}$C-NMR{2:1 (v/v) CDCl$_3$/(CF$_3$)$_2$CHOH} (ppm): 216.79 (s), 47.40 (d, J=132 Hz), 43.79 (t, J=127 Hz), 24.44 (t, J=129 Hz), 10.58 (q, J=126 Hz). IR(KBr) (cm$^{-1}$): 1707. Molecular weight=3.8× 10$^4$ versus polystyrene standards, M$_w$/M$_n$=2.8. The molar optical rotations of the B—CO copolymers prepared using (S,S)-Me-DUPHOS and (R,R)-Me-DUPHOS ligands are as follows:

(S,S)-Me-DUPHOS Ligand: Molar optical rotation: [Φ]$_D^{25}$=−64.0° (c=3.26 mg/ml, CHCl$_3$), [Φ]$_D^{25}$=+7° (c=7.27 mg/ml (CF$_3$)$_2$CHOH). (R,R)-Me-DUPHOS Ligand: Molar optical rotation: [Φ]$_D^{25}$=+65.0° (c=3.26 mg/ml, CHCl$_3$), [Φ]$_D^{25}$=−7° (c=7.27 mg/ml, (CF$_3$)$_2$CHOH).

EXAMPLE 5

This Example illustrates the preparation of optically active, isotactic, alternating 1-heptene-carbon monoxide copolymer.

The reaction was carried out following a procedure analogous to the one employed for propylene. In this Example, 1-heptene (8 ml) was used instead of propylene. The reaction was run at 50° C. for twenty-three hours under 1000 psi of CO. The resultant copolymer (4.5 gm) was washed with methanol and was dried in vacuo. The formed H—CO copolymer was found to contain a mixture of 1,4-keto and spiroketal units in the polymer backbone. Reprecipitation of the polymer in CHCl$_3$—(CF$_3$)$_2$CHOH/CH$_3$OH changed its structures to pure poly(1,4-ketone).

H—CO Poly(spiroketal/1,4-ketone) Copolymer: $^{13}$C{$^1$H}NMR (CDCl$_3$) (ppm): 212.86, 113.61, 45.27, 44.70, 44.12, 40.75, 32.48, 31.84, 31.35, 29.00, 28.20, 26.58, 22.65, 22.43, 14.10, 14.01. IR (KBr) (cm$^{-1}$): 1709, 825 (C—O—C). Anal. calcd for C$_7$H$_{14}$—CO: C, 76.1; H, 11.2. Found: C, 75.5; H, 11.1.

H—CO Poly(1,4-ketone) Copolymer: $^1$H NMR (CDCl$_3$) (ppm): 2.92 (2H, m, br), 2.68 (1H, d, J=16.5 Hz), 1.49 (1H, br), 1.25 (7H, br), 0.88 (3H, t, br). $^{13}$C{$^1$H}NMR (CDCl$_3$) (ppm): 212.86, 45.26, 44.75, 31.84, 31.36, 26.56, 22.41, 13.99. $^{13}$C-NMR{2:1 (v/v) CDCl$_3$/(CF$_3$)$_2$CHOH} (ppm): 216.22 (s), 45.93 (d, J=131 Hz), 44.25 (t, J=128 Hz), 31.77

(t, J=127 Hz), 31.29 (t, J=127 Hz), 26.68 (t, J=126 Hz), 22.36 (t, J=125 Hz), 13.62 (q, J=124 Hz). IR (KBr) (cm$^{-1}$): 1708 cm$^{-1}$. Molecular weight=8700 versus polystyrene standards, $M_w/M_n$=2.2. The molar optical rotations of the H—CO copolymers formed using (S,S)-Me-DUPHOS and (R,R)-Me-DUPHOS ligands are as follows:

(S,S)-Me-DUPHOS Ligand: Molar optical rotation: $[\Phi]_{D25}$= −91.0° (c=3.20 mg/ml, CHCl$_3$).

(R,R)-Me-DUPHOS Ligand: Molar optical rotation: $[\Phi]_D^{25}$=+90.0 (c=3.20 mg/ml, CHCl$_3$).

EXAMPLE 6

This Example illustrates the preparation of optically active, isotactic, alternating allylbenzene-carbon monoxide copolymer.

The reaction was performed following a procedure analogous to the one employed for propylene. Allylbenzene (8.9 gm) was used instead of propylene. The reaction was run at 50° C. for twenty hours using 800 psi of CO. The formed white solid (8.3 gm) was washed with acetone and dried in vacuo. The resultant allylbenzene-CO copolymer was found to have a mixture of 1,4-keto and spiroketal units in the polymer backbone. The polymer was converted to pure poly(1,4-ketone) by dissolution of the polymer in a (CF$_3$)$_2$CHOH/CHCl$_3$ mixture and reprecipitation of the concentrated polymer solution into CH$_3$OH. The spiroketal to keto structural isomerization may take as long as four days.

A—CO Poly(spiroketal/1,4-ketone) Copolymer: Solid state $^{13}$C{$^1$H}NMR (ppm): 210.86, 140.92, 128.91 (br), 113.78, 47.49, 41.75, 36.01. IR (KBr) (cm$^{-1}$): 1706, 816 (C—O—C). Anal. calcd for C$_9$H$_{10}$—CO: C, 82.2; H, 6.8. Found: C, 82.1; H, 6.9, Pd, 0.031.

A—CO Pure Poly(1,4-ketone) Copolymer: $^1$H-NMR{1:1 (v/v) CDCl$_3$/(CF$_3$)$_2$CHOH} (ppm): 7.14 (3H, m), 6.95 (2H, d, J=7.0 Hz), 2.99 (1H, m), 2.66 (1H, dd, J=13.8, 6.2 Hz), 2.51 (2H, m), 2.33 (1H, dd, J=13.8, 7.9 Hz). $^{13}$C{$^1$H}NMR (CDCl$_3$) (ppm): 211.22, 138.45, 128.91, 128.49, 126.49, 47.24, 44.33, 37.16. $^{13}$C-NMR{1:1 (v/v) CDCl$_3$/(CF$_3$)$_2$CHOH} (ppm): 214.65 (s), 138.10 (s), 129.10 (d, J=160 Hz), 128.95 (d, J=160 Hz), 127.11 (d, J=167 Hz), 47.87 (d, J=132 Hz), 44.31 (t, J=127 Hz), 37.22 (t, J=130 Hz). IR(KBr) (cm$^{-1}$): 1706. Molecular weight=7100 versus polystyrene standards, $M_w/M_n$=2.0. The molar optical rotation of the A—CO poly(1,4 -ketone) copolymer formed using (R,R)-Me-DUPHOS ligand was : $[\Phi]_D^{25}$=+165.0° (c=4.09 mg/ml, CHCl$_3$).

EXAMPLE 7

This Example illustrates the formation of isospecific alternating isomerization cooligomerization of cis-2-butene with carbon monoxide.

A solution containing 4.5×10$^{-2}$ mmol of [Pd(MeCN)$_4$] (BF$_4$)$_2$ and 4.5×10$^{-2}$ mmol of (R,R)-Me-DUPHOS in 9 ml of a 2:1 (v/v) CH$_3$NO$_2$/CH$_3$OH mixture was placed in a Parr bomb under nitrogen and charged with 18 gm of cis-2-butene and 1400 psi of CO. The reaction mixture was stirred at 70° C. for thirty-six hours. At the end of this period, a viscous liquid was obtained upon the removal of the solvent. The product was dissolved in 2-propanol and the solution was run through a short-stem silica gel chromatograph column to remove the catalyst. The pure oligomers (1.6 gm) were isolated by distilling off the 2-propanol solvent and low boiling organics at 120° C. under a high vacuum.

Stereoregular Poly(1-oxo-2-methyltetramethylene), of the formula (—CH$_2$—CH$_2$—CH(CH$_3$)—C(O)—)$_n$: $^1$H NMR (2-propanol-d$_8$) (ppm): 2.58 (1H, m), 2.48 (2H, t, br), 1.86 (1H, m), 1.56 (1H, m), 1.05 (3H, d, J=6.7 Hz), and small resonances at 6.82 (q, J=6.8 Hz), 1.73 (s), 1.30 (sextet, J=7.3 Hz), 0.90 (t, J=7.3 Hz). $^{13}$C{$^1$H}NMR (2-propanol-d$_8$) (ppm): 213.73, 45.63, 38.57, 26.91, 16.75, and small absorbances at 201.36, 138.44, 138.15, 41.13, 34.83, 28.33, 26.32, 24.25, 22.86, 14.94, 14.23, 11.85, 11.15. $^{13}$C-NMR (2-propanol-d$_8$) (ppm): 213.73 (s), 45.63 (d, J=129 Hz), 38.57 (t, J=125 Hz), 26.91 (t, J=130 Hz), 16.75 (q, J=127 Hz). IR (neat) (cm$^{-1}$): 1705. Molar optical rotation $[\Phi]_D^{25}$= −22.2° (c=12.9 mg/ml, 2-propanol).

EXAMPLE 8

This Example illustrates the reduction of optically active, isotactic, alternating P—CO poly(1,4-ketone) with LiAlH$_4$.

The starting P—CO poly(1,4-ketone) was synthesized using (R,R)-Me-DUPHOS as the ligand. To a suspension of the P—CO copolymer (0.20 gm) in 15 ml of dry THF was added 5.3 ml of 1M LiAlH$_4$ solution (in THF) under nitrogen and the resultant mixture was stirred at ambient temperature for eight hours, resulting in the complete dissolution of the polymer. The solution was stirred at 63° C. for additional four hours to ensure complete conversion of the ketone groups to the hydroxyl functionality. After the unreacted excess of LiAlH$_4$ was deactivated by dropwise addition of CH$_3$OH, the solvent was removed. The remaining solid was washed with aqueous hydrochloric acid, and the polyalcohol (0.18 gm) was purified by reprecipitation in CH$_3$OH/HCl acidified H$_2$O and washed with water.

Chiral Poly(1,4-alcohol), (—CH$_2$—CH(CH$_3$)—CH(OH)—)$_n$: $^1$H NMR (CD$_3$OD) (ppm): 4.87 (1H, s), 3.58–3.68 (1H, br), 1.62–1.75 (2H, br), 1.15–1.35 (1H, m, br), 0.94 (3H, m). $^{13}$C{$^1$H}NMR (CD$_3$OD) (ppm): 72.18–75.15 (m), 36.82–39.36 (m), 17.13, 16.37, 15.20, 14.53. IR (KBr) (cm$^{-1}$): 3405, 2961, 1459, 1381, 1017, 934, 861, 626. Molar optical rotation $[\Phi]_D^{25}$=+12.8° (c=3.21 mg/ml, CH$_3$OH).

EXAMPLE 9

This Example illustrates the hydrogenation of atactic, exclusively head-to-tail, alternating P—CO Copolymer with LiAlH$_4$.

Into a 15 ml of THF solution containing 0.20 gm of the atactic P—CO copolymer was added 5.3 ml of 1M LiAlH$_4$ solution (in THF) under nitrogen. The resultant mixture was stirred at 65° C. for five hours. After the addition of CH$_3$OH to decompose the excess unreacted LiAlH$_4$, the solvent was removed. The polyalcohol (0.15 gm) was purified by reprecipitation in CH$_3$OH/HCl acidified H$_2$O and washed with water.

Achiral Poly(1,4-alcohol), (—CH$_2$—CH(CH$_3$)—CH(OH)—)$_n$: $^1$H NMR (CD$_3$OD) (ppm): 4.87 (1H, s), 3.56 (1H, br), 1.59–1.76 (2H, br), 1.19–1.39 (1H, br.), 0.92 (3H, br). $^{13}$C{$^1$H}NMR (CD$_3$OD) (ppm): 72.17–74.60 (m), 36.35–38.90 (m), 17.07, 16.78, 16.31, 16.00, 15.18, 14.42, 13.79, 13.64. IR (KBr): no carbonyl band at ≈1710 cm$^{-1}$.

The isotactic polyketones described herein are deemed to have utility as heat processible thermoplastic materials for the production of fibers, films, and molded articles. The polyalcohols described herein are deemed to have utility as chelants, plasticizers, and dispersants.

The foregoing Examples should not be construed in a limiting sense since they are intended to merely teach certain embodiments of the instant invention. The scope of protection sought is set forth in the claims which follow.

We claim:

1. A substantially isotactic, linear, alternating copolymer of carbon monoxide and a prochiral olefin.

2. A copolymer as claimed in claim 1 wherein the individual polymer chains are homochiral and are highly enantioselective.

3. A copolymer as claimed in claim 2 wherein the enantioselectivity is greater than about 90%.

4. A copolymer as claimed in claim 1 wherein the olefin is an α-olefin containing from three to about twenty carbon atoms.

5. A copolymer as claimed in claim 4 wherein the α-olefin contains from three to about eight carbon atoms.

6. A copolymer as claimed in claim 4 wherein the α-olefin is substituted with a phenyl or cycloalkyl ring.

7. A copolymer as claimed in claim 6 wherein the α-olefin is allylbenzene.

8. A copolymer as claimed in claim 1 wherein the olefin is selected from the group consisting of propylene, 1-butene, 2-butene, 1-heptene, and allylbenzene.

9. A copolymer as claimed in claim 1 wherein the olefin is propylene.

10. A copolymer as claimed in claim 1 which is formed from an α-olefin and which is a poly(1,4-ketone).

11. A copolymer as claimed in claim 1 which is formed from an internal olefin and which is a poly(1,5-ketone).

12. A substantially isotactic, linear, alternating copolymer of carbon monoxide and a prochiral olefin which comprises poly(spiro ketal) units.

13. A copolymer as claimed in claim 4 wherein the α-olefin has an oxygen functionality.

14. A copolymer as claimed in claim 4 wherein the α-olefin has an oxygen functionality.

15. A copolymer as claimed in claim 1 which is formed from an internal olefin and which is a poly(1,6-ketone).

16. A substantially isotactic, linear polyalcohol formed by the reduction of the copolymer of claim 1.

17. A process of forming the copolymer of claim 1 which comprises polymerizing carbon monoxide and a prochiral olefin using a catalyst which comprises palladium, a chiral bidentate phosphine ligand containing a rigid bridging group and chiral moieties on the phosphorus atoms, and a weakly coordinating anion.

18. A process as claimed in claim 17 wherein the bidentate ligand is a 1,2-bis(2,5-dialkylphospholano)benzene compound.

19. A process as claimed in claim 18 wherein the bidentate ligand is a 1,2-bis(2,5-dimethylphospholano)benzene compound.

20. A process as claimed in claim 17 wherein the weakly coordinating anion is a boron anion.

21. A process as claimed in claim 20 wherein the borate anion is boron tetrafluoride.

22. A process as claimed in claim 19 wherein the weakly coordinating anion is boron tetrafluoride.

23. A catalyst for forming the copolymer of claim 1 which comprises palladium, a bidentate phosphine ligand containing a rigid bridging group and chiral moieties on the phosphorus atoms, and a weakly coordinating anion.

24. A catalyst as claimed in claim 23 wherein the bidentate ligand is a 1,2-bis(2,5-dialkylphospholano)benzene compound.

25. A catalyst as claimed in claim 24 wherein the bidentate ligand is a 1,2-bis(2,5-dimethylphospholano)benzene compound.

26. A catalyst as claimed in claim 23 wherein the weakly coordinating anion is a borate anion.

27. A catalyst as claimed in claim 26 wherein the borate anion is boron tetrafluoride.

28. A catalyst as claimed in claim 25 wherein the weakly coordinating anion is boron tetrafluoride.

29. A mixture comprising: (a) a substantially isotactic, linear, homochiral alternating copolymer of carbon monoxide and a prochiral olefin having a (+) optical rotation; and (b) a (substantially isotactic, linear, homochiral alternating copolymer of carbon monoxide and an olefin having a (−) optical rotation.

30. A mixture as claimed in claim 29 wherein the olefin used in forming each copolymer is an α-olefin containing up to about twenty carbon atoms.

31. A mixture as claimed in claim 29 wherein the olefin used in forming each copolymer is internal olefin.

32. A mixture as claimed in claim 29 wherein different α-olefins are used for the copolymers with (+) and (−) optical rotations.

33. A mixture as claimed in claim 29 wherein the α-olefin used in forming each copolymer has an oxygen functionality.

34. A mixture as claimed in claim 29 wherein the α-olefin used in forming each copolymer has an nitrogen functionality.

* * * * *